(12) United States Patent
Liu et al.

(10) Patent No.: US 11,601,240 B2
(45) Date of Patent: Mar. 7, 2023

(54) DETERMINING AN ASSOCIATION BETWEEN DMRS AND PTRS

(71) Applicant: Lenovo (Beijing) Limited, Beijing (CN)

(72) Inventors: Hongmei Liu, Beijing (CN); Chenxi Zhu, Beijing (CN); Zhennian Sun, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 211 days.

(21) Appl. No.: 16/638,373

(22) PCT Filed: Aug. 11, 2017

(86) PCT No.: PCT/CN2017/097149
§ 371 (c)(1),
(2) Date: Feb. 11, 2020

(87) PCT Pub. No.: WO2019/028851
PCT Pub. Date: Feb. 14, 2019

(65) Prior Publication Data
US 2020/0244415 A1 Jul. 30, 2020

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0632* (2013.01); *H04L 1/0003* (2013.01);
(Continued)

(58) Field of Classification Search
None
See application file for complete search history.

(56) References Cited

U.S. PATENT DOCUMENTS

2009/0028105 A1  1/2009  Schaepperle
2010/0128627 A1  5/2010  Fujita et al.
(Continued)

FOREIGN PATENT DOCUMENTS

CN  101820685 A  9/2010
CN  106031217 A  10/2016
(Continued)

OTHER PUBLICATIONS

Huawei, HiSilicon, 3GPP TSG RAN WG1 Ad Hoc Meeting, R1-1709939, "PTRS for CP-OFDM", Jun. 27-30, 2017, pp. 1-6.
(Continued)

*Primary Examiner* — Bob A Phunkulh
(74) *Attorney, Agent, or Firm* — Kunzler Bean & Adamson

(57) ABSTRACT

Apparatuses, methods, and systems are disclosed for determining an association between DMRS and PTRS. One apparatus (200) includes a processor (202) that: determines (1402) a scheduled physical resource block position and bandwidth; and determines (1404), based on the scheduled physical resource block position and bandwidth, an associated demodulation reference signal port index within the physical resource block for a phase tracking reference signal.

14 Claims, 13 Drawing Sheets

(51) Int. Cl.
*H04B 7/06* (2006.01)
*H04L 1/00* (2006.01)
*H04W 24/10* (2009.01)
*H04W 72/04* (2023.01)

(52) U.S. Cl.
CPC .......... *H04L 1/0009* (2013.01); *H04L 1/0026* (2013.01); *H04L 5/0057* (2013.01); *H04W 24/10* (2013.01); *H04W 72/042* (2013.01)

(56) References Cited

U.S. PATENT DOCUMENTS

| | | |
|---|---|---|
| 2011/0141926 A1 | 6/2011 | Damnjanovic et al. |
| 2014/0241192 A1 | 8/2014 | Kim et al. |
| 2016/0359605 A1 | 12/2016 | Zhou et al. |
| 2019/0081844 A1* | 3/2019 | Lee ..................... H04L 27/26 |
| 2020/0099465 A1* | 3/2020 | Gao ..................... H04W 72/042 |
| 2020/0169376 A1* | 5/2020 | Gao ..................... H04W 24/08 |
| 2020/0259609 A1* | 8/2020 | Saito ..................... H04L 27/261 |
| 2021/0135922 A1* | 5/2021 | Gao ..................... H04L 5/0023 |

FOREIGN PATENT DOCUMENTS

| | | |
|---|---|---|
| EP | 2117155 A1 | 11/2009 |
| WO | 2015119559 A1 | 8/2015 |

OTHER PUBLICATIONS

International Application No. PCT/CN2017/097149, Notification of Transmittal of the International Search Report and the Written Opinion of the International Searching Authority, dated May 3, 2018, pp. 1-12.

* cited by examiner

DETERMINING AN ASSOCIATION BETWEEN DMRS AND PTRS

FIELD

The subject matter disclosed herein relates generally to wireless communications and more particularly relates to determining an association between a demodulation reference signal and a phase tracking reference signal.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Code Division Multiplexing ("CDM"), Common Search Space ("CSS"), Channel Quality Indicator ("CQI"), Codeword ("CW"), Discrete Fourier Transform ("DFT"), Discrete Fourier Transform Spread ("DFTS"), Downlink Control Information ("DCI"), Downlink ("DL"), Demodulation Reference Signal ("DMRS"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Frequency Division Multiplexing ("FDM"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Multiple User ("MU"), Narrowband ("NB"), Negative-Acknowledgment ("NACK") or ("NAK"), New Data Indicator ("NDI"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Precoding Matrix Indicator ("PMI"), Physical Random Access Channel ("PRACH"), Physical Resource Block ("PRB"), Phase Tracking Reference Signal ("PTRS"), Physical Uplink Control Channel ("PUCCH"), Physical Uplink Shared Channel ("PUSCH"), Quality of Service ("QoS"), Quadrature Phase Shift Keying ("QPSK"), Rank Indicator ("RI"), Radio Resource Control ("RRC"), Random Access Procedure ("RACH"), Random Access Response ("RAR"), Resource Element ("RE"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Synchronization Signal ("SS"), Single User ("SU"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Total Radiated Power ("TRP"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, PTRS and DMRS ports may be associated. In such networks, the way the PTRS and DMRS ports are associated may be unknown.

BRIEF SUMMARY

Apparatuses for determining a SINR are disclosed. Methods and systems also perform the functions of the apparatus. In one embodiment, the apparatus includes a receiver that receives information from a remote unit on an uplink channel. In certain embodiments, the apparatus includes a processor that determines a signal-to-interference-plus-noise ratio for a scheduling layer for the remote unit based on the receiver receiving the information from the remote unit on the uplink channel.

In one embodiment, the information from the remote unit on the uplink channel includes a report from the remote unit. In certain embodiments, the report includes channel quality indication reporting corresponding to two code words. In various embodiments, in response to a channel quality indication of a second codeword of the two code words indicating a better channel quality than a channel quality indication of a first codeword of the two codewords, the processor swaps a modulation and coding scheme, a transport block size, or a combination thereof of the first and second codewords in downlink control information.

In some embodiments, in response to a channel quality indication of a second codeword of the two code words indicating a better channel quality than a channel quality indication of a first codeword of the two codewords, the processor performs a precoder column permutation for layer 0 and a smallest layer of the second codeword. In one embodiment, the report includes signal-to-interference-plus-noise ratio reporting or channel quality indication reporting for each layer of multiple layers. In a further embodiment, in response to a signal-to-interference-plus-noise ratio report of layer 0 not being a best signal-to-interference-plus-noise ratio report or a channel quality indication report of layer 0 not being a best channel quality indication report, the processor performs a precoder column permutation for layer 0 and a layer having the best signal-to-interference-plus-noise ratio report or the best channel quality indication report.

In certain embodiments, in response to the layer having the best signal-to-interference-plus-noise ratio report or the best channel quality indication report belonging to a second codeword, the processor swaps a modulation and coding scheme, a transport block size, or a combination thereof of the first codeword and a second codewords in downlink control information. In various embodiments, the signal-to-interference-plus-noise ratio is based on a measurement of the uplink channel. In one embodiment, in response to a signal-to-interference-plus-noise ratio of layer 0 not being a largest signal-to-interference-plus-noise ratio based on the measurement, the processor performs a precoder column permutation for layer 0 and a layer having the largest signal-to-interference-plus-noise ratio. In some embodiments, in response a largest signal-to-interference-plus-noise ratio based on the measurement belonging to a second codeword, the processor performs a precoder column permutation between the first codeword and a second codeword.

In various embodiments, in response a largest signal-to-interference-plus-noise ratio based on the measurement belonging to a second codeword, the processor swaps a modulation and coding scheme, a transport block size, or a combination thereof of the first codeword and a second codewords in downlink control information. In certain embodiments, in response a largest signal-to-interference-plus-noise ratio based on the measurement belonging to a second codeword, the processor recalculates a modulation and coding scheme, a transport block size, or a combination thereof of the first codeword and indicates the modulation and coding scheme, the transport block size, or a combination thereof in downlink control information.

A method for determining a SINR, in one embodiment, includes receiving information from a remote unit on an uplink channel. In certain embodiments, the method includes determining a signal-to-interference-plus-noise ratio for a scheduling layer for the remote unit based on receiving the information from the remote unit on the uplink channel.

In one embodiment, an apparatus for measuring SINR includes a processor that: determines a configuration of downlink reference signal ports; and measures a signal-to-interference-plus-noise ratio of each layer of multiple layers based on the configuration.

In one embodiment, the processor performs codeword to layer mapping based on a number of layers of the multiple layers. In certain embodiments, the apparatus includes a transmitter that transmits a report including a largest signal-to-interference-plus-noise ratio layer based on measuring the signal-to-interference-plus-noise ratio of each layer.

In various embodiments, the processor determines a precoding matrix based on measuring the signal-to-interference-plus-noise ratio of each layer. In some embodiments, each column of the precoding matrix includes a precoding vector, and each precoding vector is determined based on a corresponding layer of the multiple layers. In one embodiment, in response to a largest signal-to-interference-plus-noise ratio corresponding to a layer that is not layer 0, the processor exchanges in the precoding matrix the precoding vector for layer 0 with the precoding vector for the layer having the largest signal-to-interference-plus-noise ratio to produce a permutated precoding matrix. In a further embodiment, the processor determines a channel quality indication for each codeword of multiple codewords based on the permutated precoding matrix. In certain embodiments, the apparatus includes a transmitter that transmits a report including the channel quality indication for each codeword. In various embodiments, a base unit determines the permutated precoding matrix based on a layer having a largest signal-to-interference-plus-noise ratio and the precoding matrix. In one embodiment, the apparatus includes a transmitter that transmits a report including the precoding matrix.

A method for measuring SINR, in one embodiment, includes determining a configuration of downlink reference signal ports. In various embodiments, the method includes measuring a signal-to-interference-plus-noise ratio of each layer of multiple layers based on the configuration.

In one embodiment, an apparatus for determining an association between DMRS and PTRS includes a processor that: determines a scheduled physical resource block position and bandwidth; and determines, based on the scheduled physical resource block position and bandwidth, an associated demodulation reference signal port index within the physical resource block for a phase tracking reference signal.

In one embodiment, the processor associates the phase tracking reference signal to a demodulation reference signal port based on the physical resource block bearing phase tracking reference signal with a smallest physical resource block index. In certain embodiments, the processor associates the phase tracking reference signal to the smallest demodulation reference signal port index for the physical resource block bearing phase tracking reference signal with smallest physical resource block index.

In various embodiments, the processor associates, based on a scheduled physical resource block position in a carrier or bandwidth part, the phase tracking reference signal to a demodulation reference signal port index for the physical resource block bearing phase tracking reference signal with smallest physical resource block index. In some embodiments, the processor associates the phase tracking reference signal to the indicated demodulation reference signal port in downlink control information, radio resource control, or a combination thereof for the physical resource block bearing phase tracking reference signal with smallest physical resource block index. In one embodiment, the processor determines a demodulation reference signal port index difference for adjacent phase tracking reference signals bearing physical resource blocks. In a further embodiment, the determined demodulation reference signal port index difference is based on a demodulation reference signal port difference between two codewords. In certain embodiments, the determined demodulation reference signal port index difference is based on a default value. In various embodiments, the determined demodulation reference signal port index difference is based on signaling by downlink control information, radio resource control, or a combination thereof. In one embodiment, the signaling is part of an uplink grant or a downlink assignment.

In some embodiments, the processor determines a phase tracking reference signal resource element position within a physical resource block based on the demodulation reference signal port index. In certain embodiments, the processor determines a phase tracking reference signal precoding vector to be the same as a precoding vector of the associated demodulation reference signal port. In various embodiments, the processor determines a phase tracking reference signal resource element position within a physical resource block based on a smallest demodulation reference signal port index. In some embodiments, the processor determines a phase tracking reference signal resource element position within a physical resource block based on radio resource control signaling.

A method for determining an association between DMRS and PTRS, in one embodiment, includes determining a scheduled physical resource block position and bandwidth. In certain embodiments, the method includes determining, based on the scheduled physical resource block position and bandwidth, an associated demodulation reference signal port index within the physical resource block for a phase tracking reference signal.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
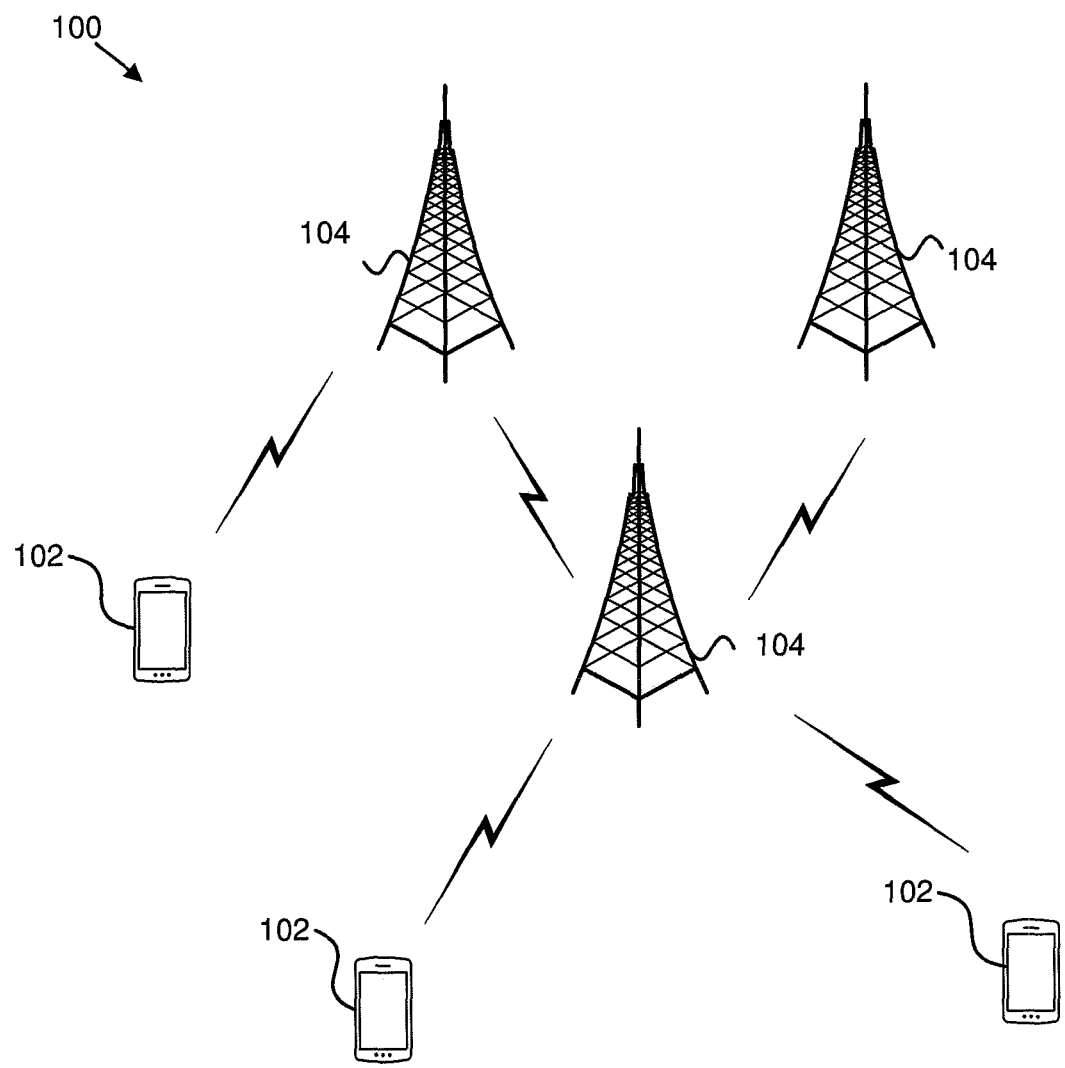
FIG. 1 is a schematic block diagram illustrating one embodiment of a wireless communication system for determining an association between DMRS and PTRS.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the is schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining an association between DMRS and PTRS. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network, an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may receive information from a remote unit 102 on an uplink channel. In certain embodiments, the base unit 104 may determine a SINR for a scheduling layer for the remote unit 102 based on receiving the information from the remote unit 102 on the uplink channel. Accordingly, a base unit 104 may be used for determining a SINR.

In one embodiment, a remote unit 102 may determine a configuration of downlink reference signal ports. In various embodiments, the remote unit 102 may measure a SINR of each layer of multiple layers based on the configuration. Accordingly, a remote unit 102 may be used for measuring SINR.

In certain embodiments, a remote unit 102 may determine a scheduled PRB position and bandwidth. In certain embodiments, the remote unit 102 may determine, based on the scheduled PRB position and bandwidth, an associated DMRS port index within the PRB for a PTRS. Accordingly, a remote unit 102 may be used for determining an association between DMRS and PTRS.

Figure 2:
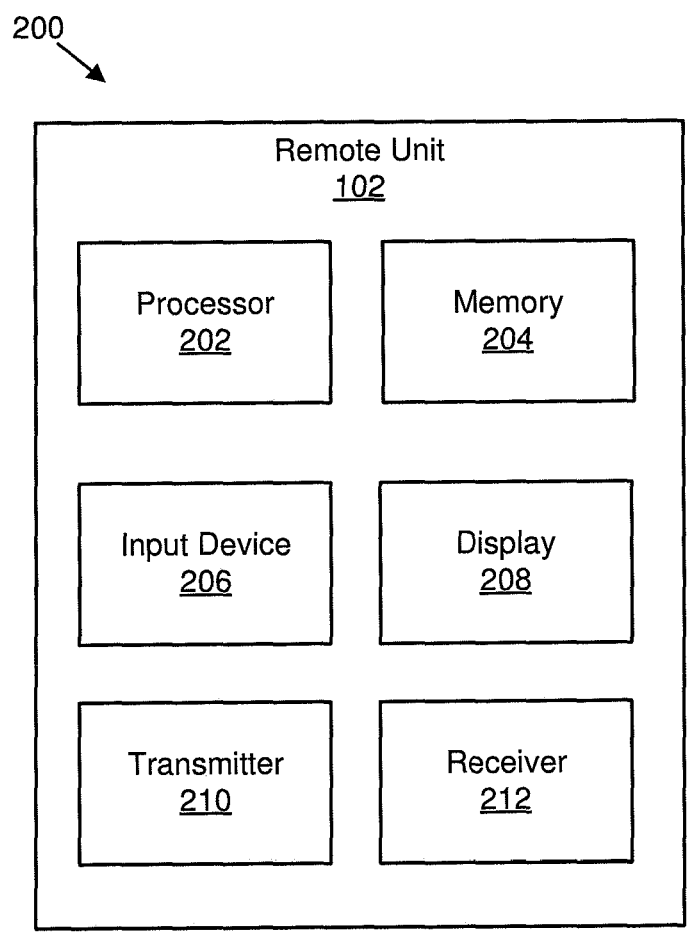
FIG. 2 is a schematic block diagram illustrating one embodiment of an apparatus that may be used for determining an association between DMRS and PTRS.

FIG. 2 depicts one embodiment of an apparatus 200 that may be used for determining an association between DMRS and PTRS. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. hi certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In certain embodiments, the processor 202 may determine a configuration of downlink reference signal ports. In various embodiments, the processor 202 may measure a SINR of each layer of multiple layers based on the configuration.

In one embodiment, the processor 202 may determine a scheduled PRB position and bandwidth. In certain embodiments, the processor 202 may determine, based on the scheduled PRB position and bandwidth, an associated DMRS port index within the PRB for a PTRS. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
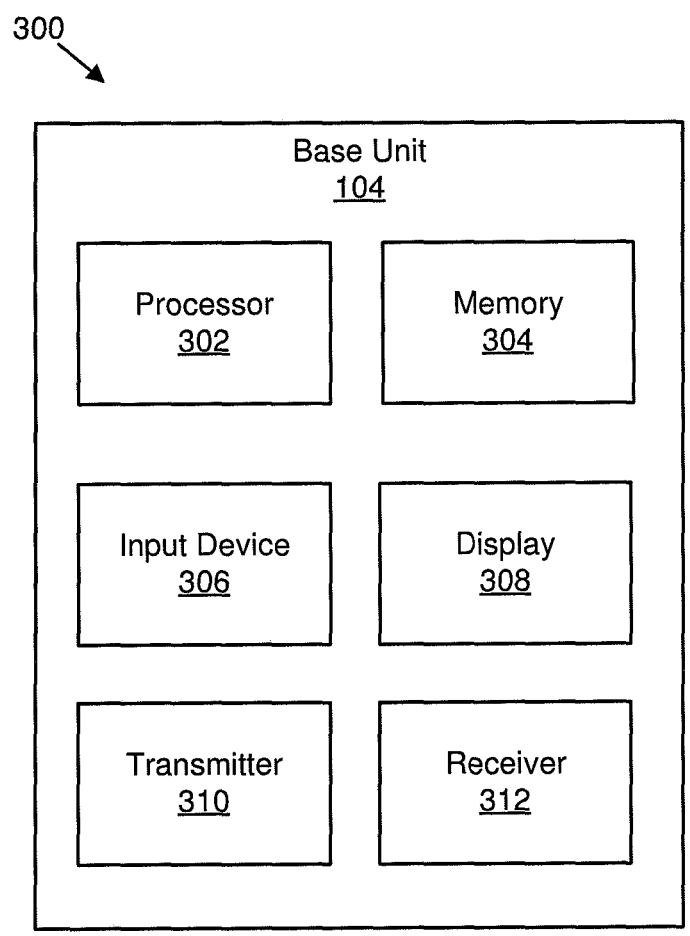
FIG. 3 is a schematic block diagram illustrating one embodiment of an apparatus that may be used for determining an association between DMRS and PTRS.

FIG. 3 depicts one embodiment of an apparatus 300 that may be used for determining an association between DMRS and PTRS. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may receive information from a remote unit 102 on an uplink channel. In certain embodiments, the processor 302 may determine a SINR for a scheduling layer for the remote unit 102 based on receiving the information from the remote unit 102 on the uplink channel. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
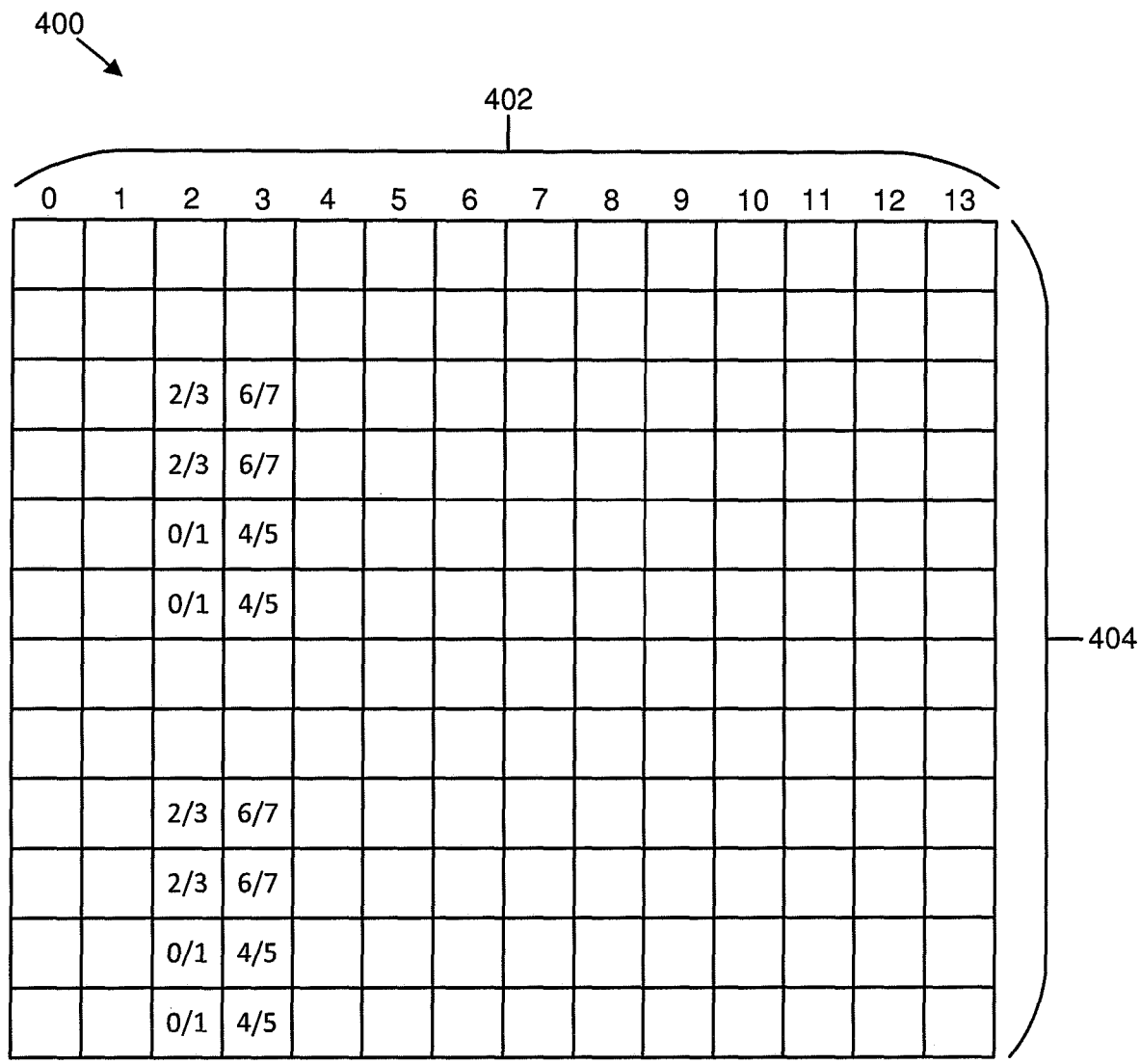
FIG. 4 is a schematic block diagram illustrating one embodiment of a DMRS pattern.

FIG. 4 is a schematic block diagram illustrating one embodiment of a DMRS pattern. Specifically, the DMRS pattern is illustrated in a set of resource elements 400. Each resource element occupies a symbol 402 in a time domain and a subcarrier 404 in a frequency domain. 14 symbols 402, and 12 subcarriers 404 are illustrated in the set of resource elements 400.

In certain embodiments, DMRS may be used for channel estimation. In one embodiment, up to 8 ports may be supported for a single UE, and up to 12 ports may be be supported for multiples UEs. In various embodiments, the different antenna ports may be multiplexed by TDM, FDM, CDM, and/or TD/FD-OCC/TDM. As illustrated in FIG. 4, one embodiment supports 8 ports (e.g., labeled as 0, 1, 2, 3, 4, 5, 6, and 7), and FDM, TDM, and FD-OCC are used to multiplex the different DMRS antenna ports.

In some embodiments, for multi-layer single user data transmission, all layers may be carried in the same time/frequency resources. In such embodiments, different layers may be multiplexed by using different precoding vectors in a spatial domain. In certain embodiments, a decoding procedure at a receiver side may include the following three steps.

In a first step, the receiver may derive a channel response for each antenna port based on antenna port specific orthogonal resources. For example, to derive antenna port 0's channel response h, a received signal r at all the REs in FIG. 4 labeled with "0/1" are received and combined together.

In a second step, channel estimation is performed based on the receiver signal r and/or a transmitted signal s. Various algorithms may be used to perform channel estimation (e.g., zero forcing ("ZF"), minimum mean square error ("MMSE"), etc.). After channel estimation, an estimated channel for each antenna port may be derived. For example, antenna port 0's channel response is estimated as h'.

In a third step, estimated channel response is used to recover data. For a 4 layer SU-MIMO transmission, channel response at antenna ports 0, 1, 2, and 3 may be derived individually and used to construct a receiver side processing matrix. Based on the received data signal (r1, r2, ..., r_RX) at different receive antenna elements, the data may be recovered, and input to further processing units.

In some embodiments, for multi-layer multiple user data transmissions, the above three steps may be used with a few changes. The main difference is that the total number of ports are divided by different UEs. For example, antenna ports 0, 1, 2, and 3 are used for a first UE and antenna ports 4, 5, 6, and 7 are used for a second UE. The first and second UEs data share the same time/frequency resources. Precoding vectors corresponding to antenna ports 0, 1, 2, and 3 are used for the first UE's data transmission, and precoding vectors corresponding to antenna ports 4, 5, 6, and 7 are used for the second UE's data transmission. From a signaling perspective, a UE may need to know the detailed antenna ports for its own usage. That is, antenna ports 0, 1, 2, and 3 need to be indicated to the first UE, and antenna ports 4, 5, 6, and 7 need to be indicated to the second UE.

Figure 5:
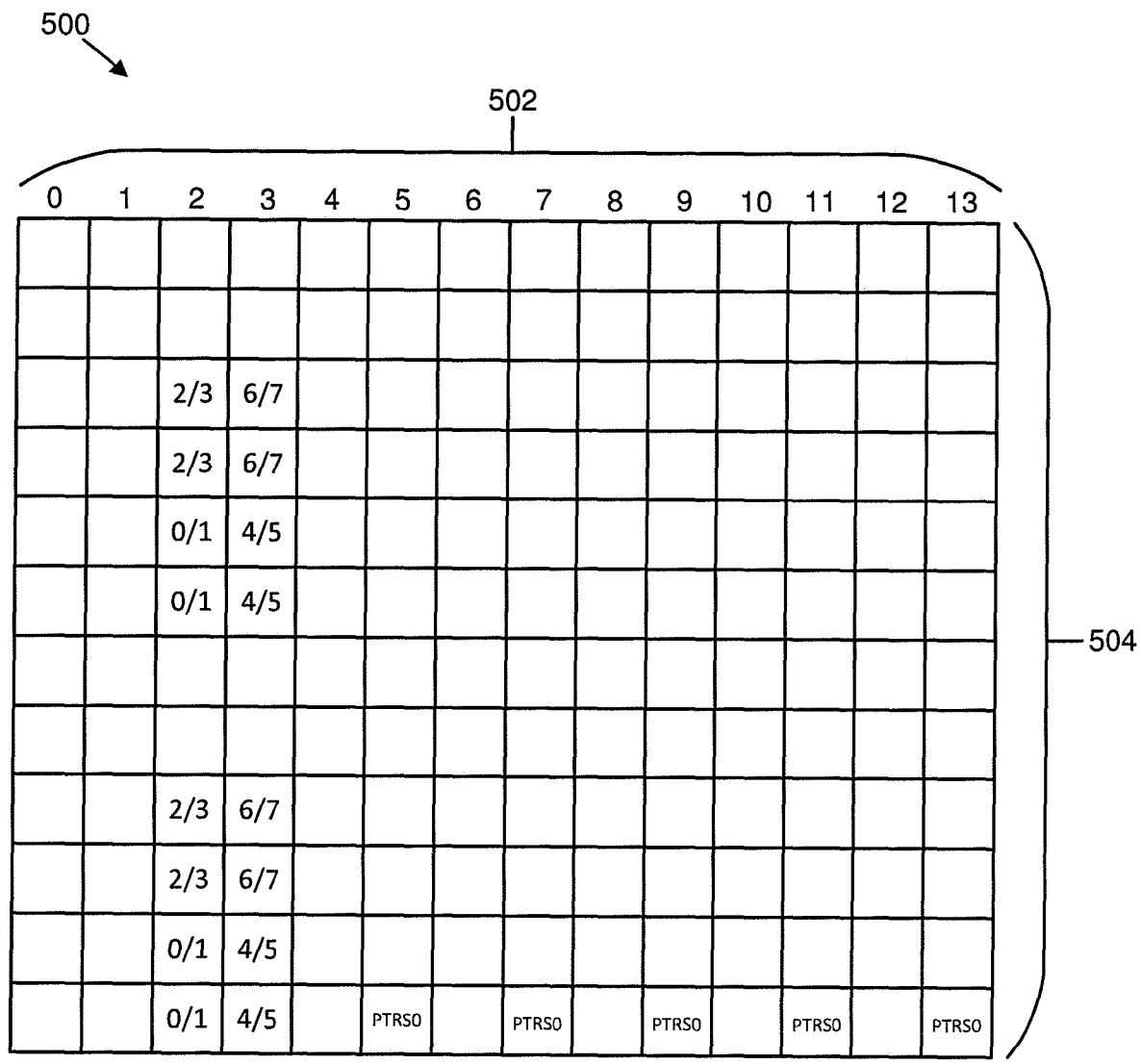
FIG. 5 is a schematic block diagram illustrating one embodiment of a PTRS pattern.

FIG. 5 is a schematic block diagram illustrating one embodiment of a PTRS pattern. Specifically, the PTRS pattern is illustrated in a set of resource elements 500. Each resource element occupies a symbol 502 in a time domain and a subcarrier 504 in a frequency domain. 14 symbols 502, and 12 subcarriers 504 are illustrated in the set of resource elements 500.

In certain embodiments, PTRS may be used to track a phase difference in a time domain. In various embodiments, PTRS may mainly be used for high speed and larger subcarriers. One embodiment of a PTRS pattern is illustrated in FIG. 5.

In certain embodiments, a time domain PTRS density is related to a scheduled MCS. Accordingly, with the scheduled MCS value and RRC configured MCS and/or density mapping, PTRS bearing symbols in the time domain may be derived.

In various embodiments, a frequency domain PTRS density may be related to a scheduled bandwidth. With the scheduled bandwidth and RRC configured bandwidth and/or density mapping, the PTRS bearing PRB in the frequency domain can be derived. In some embodiments, the PTRS RE position within a PTRS bearing PRB may be determined using several factors. For example, the PTRS RE position may be near an associated DMRS port RE position to provide accurate phase tracking performance. In certain embodiments, PTRS may be shifted or punctured to avoid collision with other reference signals, such as CSI-RS, SS block, and/or PDCCH time and/or frequency resources.

In one embodiment, a PTRS port number is related to a transmitter side TRP and/or panel number due to separate oscillators. In certain MU-MIMO configurations, different users may use separate PTRS due to different precoding vectors. In such embodiments, multiplexing may be completed using FDM, TDM, or CDM.

In various embodiments, a DMRS is used to estimate a channel from one or two DMRS bearing symbols, and interpolation may be used to get a channel response in other non-DMRS symbols. In some embodiments, such as with high frequency band and high speed, a channel may change more dynamically in the frequency domain. As such, PTRS may be used to estimate the phase difference, and combined with channel estimation based on DMRS, to get a channel response for all the symbols.

In certain embodiments, for a single UE, multiple DMRS ports form a DMRS port group to perform SU MIMO transmission. The DMRS port group may correspond to a TRP or panel. In various embodiments, a single PTRS port may be used for a single UE, and the PTRS port may be associated with a TRP or panel. As a result, there may be a PTRS port associated with a DMRS port group, and the PTRS port may share the same precoding vector with one of the DMRS ports.

In a first embodiment for PTRS and DMRS port association, if one DL PTRS port is configured for a DL DMRS port group, the DL PTRS port and one DL DMRS port in the DL DMRS port group are associated for phase tracking, the association may be determined in a specification.

In a second embodiment for PTRS and DMRS port association, if one DL PTRS port is configured for a DL DMRS port group, the DL PTRS port is associated with one of the following: a first option in which the lowest DL DMRS port in the DL DMRS port group; or a second option in which one DL DMRS port in the DL DMRS port group in a RB, where the one DL DMRS port may vary across RBs.

In some embodiments, with the first option, a DMRS port 0 may be chosen to be associated with the PTRS port, that is, the PTRS port may share the same precoding vector with DMRS port 0. In various embodiments, because the SINR on different DMRS ports may be different, and the largest SINR port may change for different channel characteristics, the PTRS port may be associated with the DMRS port having the largest SINR.

In certain embodiments, to obtain the largest SINR for DMRS port 0, a precoder permutation may be used. For example, with precoder permutation, DMRS port 0 may always be associated the largest SINR of the channel. Meanwhile, in some embodiments, data layer 0 may also always be associated with the largest SINR of the channel. In such embodiments, this may lead to SINR imbalance among different layers and/or CWs.

In various embodiments, with the second option, an association between PTRS and DMRS may change from PRB to PRB. In such embodiments, this may provide some kind of frequency domain diversity; however, it may impact the coexistence of PTRS and other reference signals.

Figure 6:
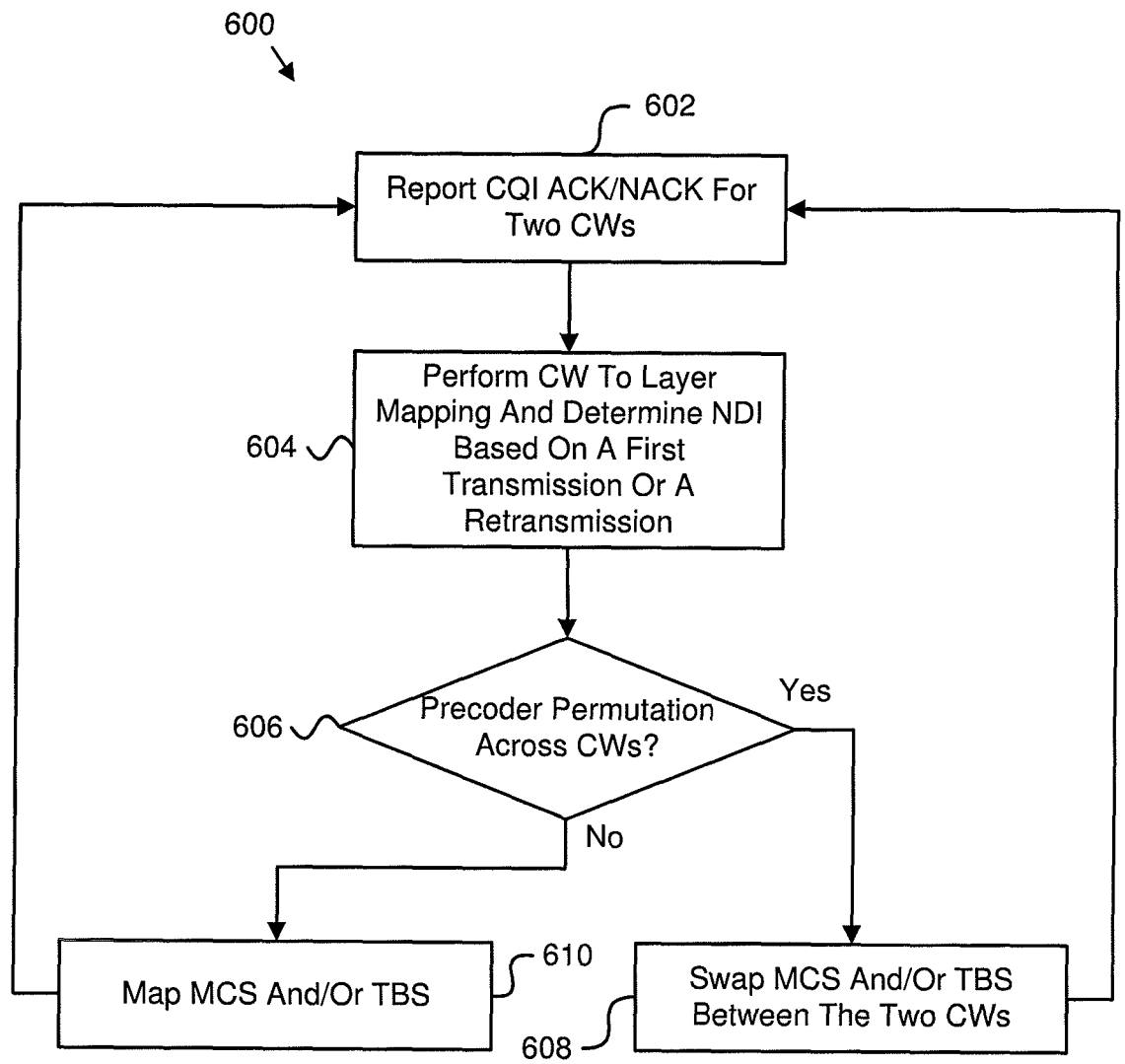
FIG. 6 is a schematic flow chart diagram illustrating one embodiment of a method for swapping MCS and/or TBS between two CWs.

FIG. 6 is a schematic flow chart diagram illustrating one embodiment of a method 600 for swapping MCS and/or TBS between two CWs.

In certain embodiments, the method 600 includes reporting 602 CQI ACK/NACK for two CWs (e.g., as in a regular case or in response to channel measurement based on uplink signals and/or channels in a channel reciprocity case). In some embodiments, two CWs may be used in response to the rank indication being larger than 4, otherwise, one CW may be used.

In various embodiments, the method 600 includes performing 604 CW to layer mapping and determining a NDI based on a first transmission or a retransmission. In certain embodiments, in response to completing CW to layer mapping, the method 600 determines 606 whether there is a precoder permutation across different codewords. When there are multiple layers for transmission, the precoding matrix contains multiple columns, and each column corresponds to a transmission layer and corresponds to a precoding vector. As used herein, precoder permutation means one or more precoding vectors are exchanged (e.g., swapped) among different transmission layers. When the exchanged transmission layers belong to different CWs, there is precoder permutation among different codewords.

In response to the method 600 determining 606 that there are different precoder permutation across different CWs, the method 600 may swap 608 MCS and/or TBS between the two CWs and keep the NDI the same in the CWs (e.g., not swap the NDI). In another embodiment, the MCS for the two CWs can also be recalculated based on the permutated precoding matrix. In one embodiment, the precoder permutation may be a one-to-one permutation; while, in another embodiment, the precoder permutation may be a group-to-group permutation. For example, if there are 5 layers in total for data transmission, layers 0 and 1 may be used for a first codeword ("CW0"), and layers 2, 3, and 4 may be used for a second codeword ("CW1"). If layer 2 is the highest SINR layer (e.g., layer 2 has the highest SINR out of all the layers), the precoding vector of layer 0 and layer 2 may be exchanged. In addition, in certain embodiments, the precoding vector of layer 1 and layer 3 may also be exchanged.

Figure 7:
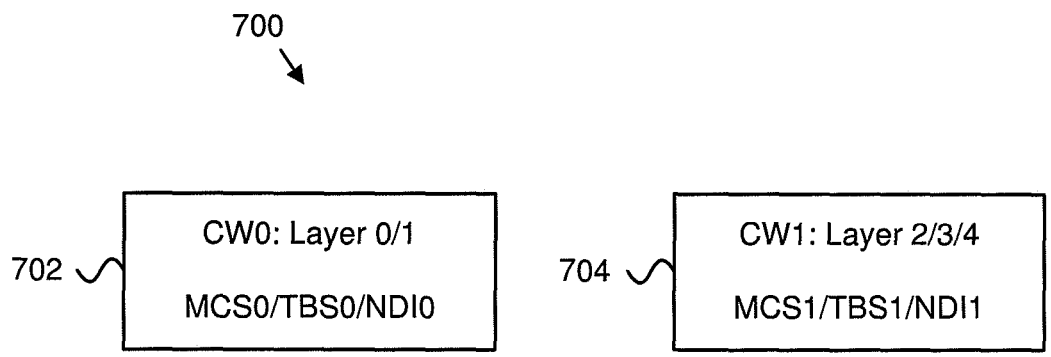
FIG. 7 is a schematic block diagram illustrating one embodiment of MCS and TBS in two CWs before swapping the MCS and TBS.

Turning to FIG. 7, FIG. 7 is a schematic block diagram illustrating one embodiment of MCS and TBS in two CWs 700 before swapping the MCS and TBS. CW0 702 is associated with MCS0/TBS0/NDI0 based on base unit 104 scheduling, and CW1 704 is associated with MCS1/TBS1/NDI1 based on base unit 104 scheduling.

Figure 8:
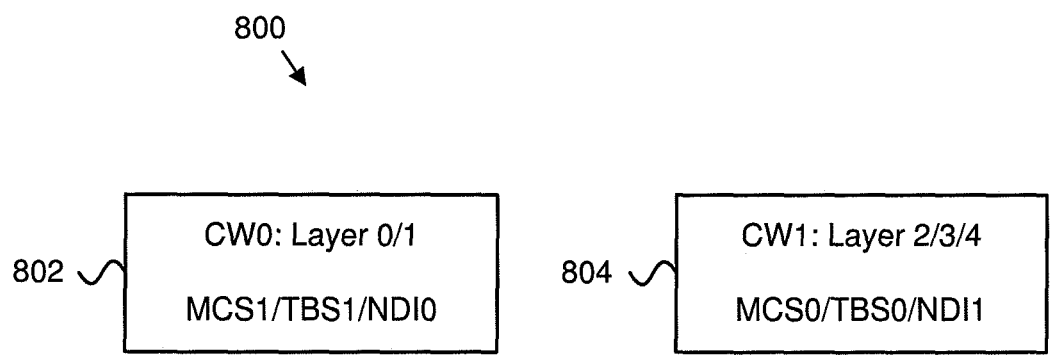
FIG. 8 is a schematic block diagram illustrating one embodiment of MCS and TBS in two CWs after swapping the MCS and TBS.

Turning to FIG. 8, FIG. 8 is a schematic block diagram illustrating one embodiment of MCS and TBS in two CWs 800 after swapping the MCS and TBS. If data layer 0 and data layer 3 are swapped so that the largest SINR is transmitted on data layer 0, then new CW0 802 will be associated with MCS1/TBS1/NDI0, and new CW1 804 will be associated with MCS0/TBS0/NDI1. As data layer 0 share the same precoding vector as DMRS port 0, and data layer 3 share the same precoding vector as DMRS port 3, the precoding vectors for DMRS port 0 and 3 are also swapped. In some embodiments, MCS0, TBS0, MCS1, and/or TBS1 may be recalculated based on the new layer grouping. In certain embodiments, a base unit 104 may derive the detailed SINR of each layer based on an uplink channel measurement in a channel reciprocity case or per layer SINR feedback (or other feedback such as CQI) from a UE. In various embodiments, if there is only CQI reporting for the two CWs as in regular case, the two CQI values may be compared. In such an embodiment, if the CQI of CW1 is better than that of CW0, precoder column permutation may be performed between layer 0 and the smallest layer of CW1. In some embodiments, if there is precoder permutation within a single CW, MCS/TBS selection may be performed as in regular case.

Returning to FIG. 6, in response to the method 600 determining 606 that there are not different precoder permutation across different CWs, the method 600 may map 610 MCS and/or TBS without swapping (e.g., ACK/NACK feedback for the two CWs may be performed as in a regular case). In certain embodiments, the CWs may be retransmission with NACK feedback, and may indicate a corresponding retransmission via NDI for each CW. In some embodiments, the method 600 may use no additional signaling overhead and be transparent to a UE; however, there may be a mismatch between the swapped MCS/TBS and channel characteristics.

Figure 9:
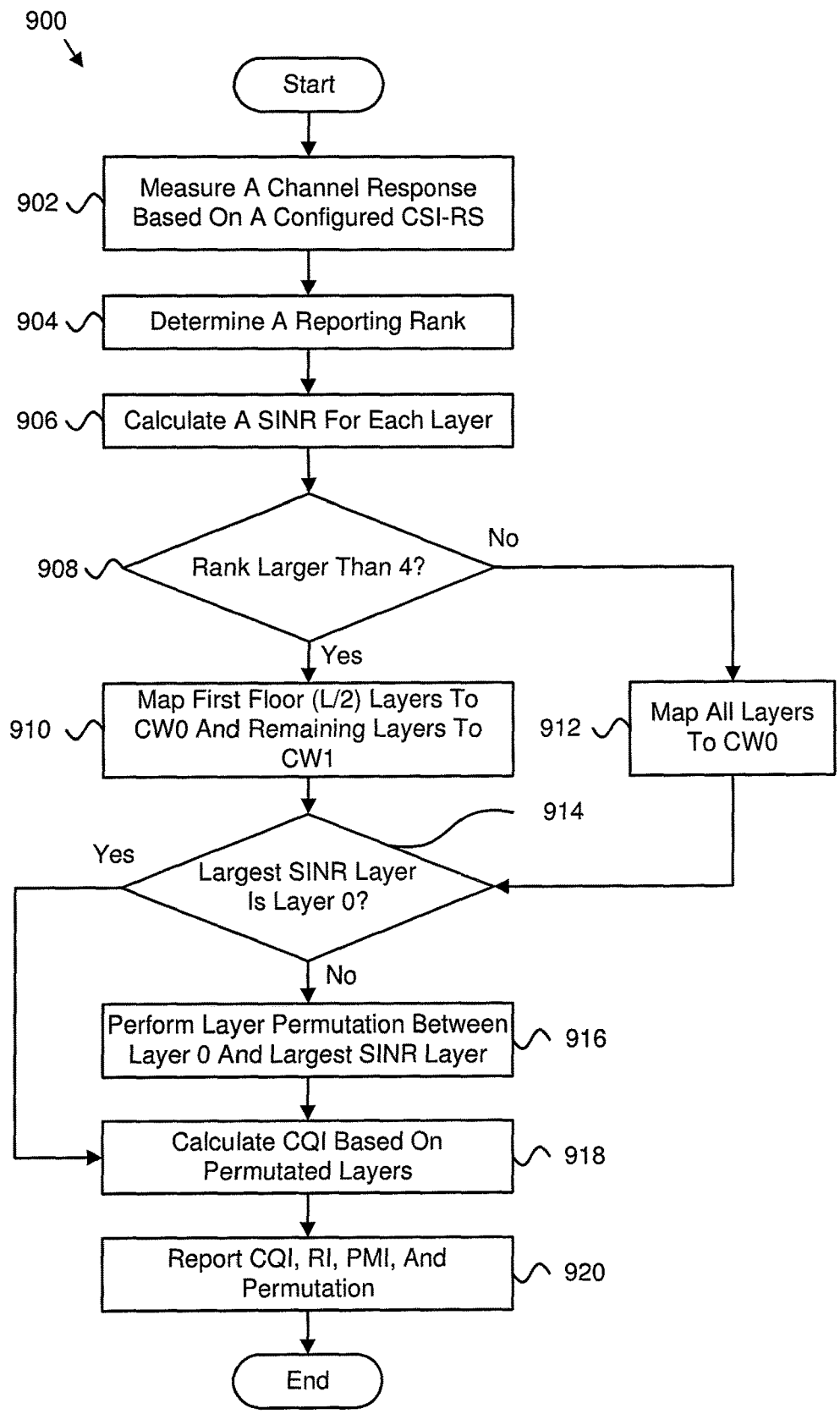
FIG. 9 is a schematic flow chart diagram illustrating one embodiment of a method for precoder permutation.

Turning to FIG. 9, FIG. 9 is a schematic flow chart diagram illustrating one embodiment of a method 900 for precoder permutation. The method 900 may include a UE measuring 902 a channel response based on a configured CSI-RS. The method 900 may also include the UE determining 904 a reporting rank based on the measured channel response. The method 900 may include the UE calculating 906 a SINR value for each layer. In certain embodiments, instead of calculating 906 the SINR, the UE may calculate another value, such as CQI, a singular value, and so forth.

The method 900 determines 908 whether the rank is larger than 4. In response to the method 900 determining 908 that the rank is larger than 4, the method 900 may map 910 first floor (e.g., (number of layers/2) rounded down) layers to CW0 and remaining layers to CW1. For example, when the rank is 5, then layers 0 and 1 may be mapped to CW0 and layers 2, 3, and 4 may be mapped to CW1. In some embodiments, the method 900 may map layers in other ways. In response to the method 900 determining 908 that the rank is less than or equal to 4, the method 900 may map 912 all layers to CW0. For example, when the rank is 4, then layers 0, 1, 2, and 3 may be mapped to CW0.

The method 900 may determine 914 whether the largest SINR layer is layer 0. In response to the method 900 determining 914 that the largest SINR layer is not layer 0, then the method 900 may perform 916 layer permutation between layer 0 and the largest SINR layer. In certain embodiments, the layer permutation may be performed between layer groups of CW0 and CW1, especially if a number of layers of two CWs are the same. The method 900 may calculate 918 the CQI based on the permutated layers for the one or two CWs. In some embodiments, the method 900 may determine the CQI for the one or two CWs based on the layer mapping before permutation if the layers of two CWs are the same. In various embodiments, the method 900 may report 920 CQI, RI, PMI, and/or permutation information. In certain embodiments, the UE may report the largest SINR layer before permutation for permutation reporting. For example, if the maximum transmission layer is 8, then 3 bits may be used to indicate which layer is permutated. If 100 is indicated, it may mean that layer 4 is changed with layer 0. The reported CQI may be the CQI determined from the calculation 918, and the RI may be the rank from determining 904. In some embodiments, PMI before permutation may be reported so that codebook design may not be impacted.

In some embodiments, the base unit 104 may reconstruct the precoding vector based on the reported PMI and the permutation reporting. For example, if 010 is reported in the permutation reporting, then column 0 and column 4 in the reported precoding matrix may be exchanged. If the permutation is per group, and 100 is reported in the permutation reporting, it may mean that layer 4 is the largest SINR layer, and if layer 4 belongs to CW1, then columns 0, 1, 2, and 3 and columns 4, 5, 6, and 7 in the reported precoding matrix may be exchanged respectively.

In certain embodiments, the base unit 104 performs updates to the constructed precoding vector and the reported CQI and/or RI if necessary. In some embodiments, the method 900 may have a reported CQI value that matches with the permutated precoding vector; however, the method 900 may increase UE complexity and overhead compared to method 600.

In some embodiments, for a MU case, each UE may have its own UE specific PTRS port. In such embodiments, precoder column permutation may be performed per user. In various embodiments, if the CW for each MU UE is restricted to 1, precoder column permutation may be performed at the transmitter side for each UE, and due to the same MCS/TBS/CQI for different layers of the single CW for each UE, there may be no performance impact. For example, if ports 0 and 1 are used for UE1, and ports 2 and 3 are used for UE2. For UE1, if port 1 has a larger SINR than port 0, then permutation between port 0 and port 1 may be performed at the transmitter side. For UE2, if port 3 has the largest SINR, then permutation between port 2 and port 3 may also be performed at transmitter side. If two codewords are used for each MU UE, both transmitter side permutation and UE side permutation may be used.

In certain embodiments, transmitter side permutation for scheduled MU UEs may be used. For example, ports 0 and 1, and CW0 and CW1 may be used for UE1, and ports 2 and 3 and CW0 and CW1 may be used for UE2. UE1 and UE2 may be scheduled in the same time and/or frequency resources. In such embodiments, transmission power of both UE1 and UE2 may be reduced by 3 dB due to the same time/frequency resources being used. In certain embodiments, UE1 has its own UE specific PTRS port 0 for phase tracking, and UE2 also has its own UE specific PTRS port 0 for phase tracking. For UE1, if port 0 SINR is smaller than that of port 1, precoder column permutation for layer 0 and layer 1 may be performed. Moreover, MCS/TBS swapping may be performed for UE1's two CWs. Similar operation may be used by UE2. In various embodiments, UE side permutation for each scheduled MU UE may be used.

In certain embodiments, the frequency domain PTRS density may be related to the scheduled bandwidth. That is, based on an RRC configured bandwidth-density mapping table, with the scheduled bandwidth in DCI format, a UE may derive the PTRS bearing PRB. For example, if the scheduled bandwidth is 30 PRB, and the corresponding density is 1/3 by the mapping table, then the UE can derive that PRBs 0, 3, 6, 9, 12, 15, 18, 21, 24, and 27 are the PTRS bearing PRBs. For a single PTRS port, a single RE in a PRB may be used. In such embodiments, the detailed PTRS RE position may be related to the associated DMRS port.

In various embodiments, a UE may be allocated to multiple DMRS ports for spatial multiplexing operations. Different DMRS ports may be multiplexed by FDM, TDM, and/or CDM to provide accurate channel estimation. For example, DMRS port 0 may be associated with REs including 0/1 and 4/5 in FIG. 4, and DMRS port 2 may be associated with REs including 2/3 and 6/7 in FIG. 4. If PTRS port 0 is associated with DMRS port 0, then the PTRS RE position should be limited with REs including 0/1 and 4/5 due to similar channel characteristics for neighboring REs, and the precoding vector should be the same for PTRS port 0 and DMRS port 0. If PTRS port 0 is associated with DMRS port 2, then the PTRS RE position should be limited to REs including 2/3 and 6/7, and PTRS port 0 share the same precoding vector with DMRS port 2.

In various embodiments, the associated DMRS port for PTRS may change from PRB to PRB. This may mean that the precoding vector and the RE position of a PTRS port may be changed from PRB to PRB. With such an embodiment, frequency domain diversity may be achieved as this is similar to precoder cycling in the frequency domain.

In certain embodiments, the RE position within a PRB is changed from PRB to PRB. This may mean that the PTRS port 0 frequency domain distribution is not even. Moreover, there may some performance impact due to uneven distribution if interpolation is used in frequency domain. In some embodiments, coexistence between PTRS and other RS and/or channels may be common. The possible coexisted RS and/or channels may be CSI-RS, SS block, PDCCH control resources, and/or data. If PTRS always has the lowest priority, then may be no impact to other RS and/or channels. However, other RS and/or channels may use puncturing, shifting, and/or dropping to avoid PTRS time/frequency resources. In various embodiments, there may be different puncturing, shifting, and/or dropping patterns in different PTRS bearing PRBs.

In some embodiments, the RE position for a PTRS bearing PRB may be known to the UE. In certain embodiments, there may be an implicit way to derive the associated DMRS port for each PTRS bearing PRB. For example, a UE may derive the associated DMRS port for each PTRS bearing PRB based on a scheduled PRB position and bandwidth. In various embodiments, the PTRS bearing PRB with a smallest PRB index is associated with DMRS port 0. In various embodiments, with an increasing PRB index, the associated DMRS port index may also increase ((e.g., 0, 1, . . . max DMRS port index, 0, 1, . . . ) mapped to each PTRS bearing PRB respectively). In some embodiments, a max DMRS port may be indicated in DCI. As another example, deriving the associated DMRS port for each PTRS bearing PRB may be cell specific and may be derived by extending the PTRS bearing PRB to the total system bandwidth (e.g., by mapping the DMRS port index (0, 1, . . . , max DMRS port index, 0, 1, . . . ) to the PTRS bearing PRB of the system bandwidth). For a single UE, the part corresponding to the scheduled bandwidth may be used. For example, the DMRS port index may be 0, 1, . . . , max DMRS port index, and the PTRS bearing PRB index from the start of the carrier bandwidth or bandwidth part may be indexed as 0, 1, 2, . . . , max PTRS bearing PRB index. If the UE allocated bandwidth part overlaps with PTRS bearing PRB i, i+1, . . . , j, then the associated DMRS port are i mod (max_DMRS_port_index+1), (i mod (max_DMRS_port_index+1))+1, . . . , respectively. In certain embodiments, a difference between UE specific and cell specific deriving of the associated DMRS port for each PTRS bearing PRB may be that a starting DMRS port index is changed and/or that cell specific may be better for DMRS port starting index randomization.

In some embodiments, explicit signaling may be used to indicate an associated DMRS port index for the smallest PTRS bearing PRB index. Such signaling may be performed using DCI signaling and/or RRC signaling. In certain embodiments, if the possible max DMRS ports for a single UE is 8, then 3 bits may be used for signaling.

In various embodiments, a hopping pattern may be used. In such embodiments, a hopping step may be any suitable value, such as 0, 1, 2, etc. In some embodiments, a 0 may indicate the DMRS port index difference between two CWs. For example, if there are two CWs, CW0 is associated with DMRS port indexes 0, 1, and 2, and CW1 is associated with DMRS port indexes 3, 4, 5, and 6, then the first, third, and fifth PTRS bearing PRBs are associated with DMRS ports having indexes 0, 1, and 2, respectively, and the second, fourth, sixth, and eighth PTRS bearing PRB are associated with DMRS ports having indexes 3, 4, 5, and 6, respectively. In various embodiments, the PTRS bearing PRBs are re-indexed as 0, 1, 2 . . . . In such embodiments, a hopping step of 1 indicates that the difference between two adjacent DMRS port indexes is one times the difference between adjacent PTRS bearing PRBs re-indexed indices. Moreover, a hopping step of 2 indicates that the difference between two adjacent DMRS ports is two times the difference of adjacent PTRS bearing PRBs re-indexed indices. For example, if there are DMRS ports 0, 1, 2, and 3, and PTRS bearing PRB index 00, 01, 02, 03, and 04, when the hopping step is 2, then PTRS PRB index 00 is associated with DMRS port 0, PTRS PRB index 01 is associated with DMRS port 2, PTRS PRB index 02 is associated with DMRS port 0, PTRS PRB index 03 is associated with DMRS port 2, PTRS PRB index 04 is associated with DMRS port 0. As another example, if there are DMRS ports 0, 1, 2, and 3, and PTRS bearing PRB index 00, 01, 02, 03, and 04, when the hopping step is 1, then PTRS PRB index 00 is associated with DMRS port 0, PTRS PRB index 01 is associated with DMRS port 1, PTRS PRB index 02 is associated with DMRS port 2, PTRS PRB index 03 is associated with DMRS port 3, PTRS PRB index 04 is associated with DMRS port 0.

In one embodiment, hopping information may be signaled explicitly using DCI signaling and/or RRC signaling. In such embodiments, the hopping information may be signaled using 1 or 2 bits. In various embodiments, hopping information may be determined implicitly based on a scheduled bandwidth and a max DMRS port index. For example, if the number of PTRS bearing PRBs is larger than the max DMRS port index, hopping_step=1; otherwise, hopping_step=ceil(max_DMRS_port_index/PTRS_bearing_PRB_number) or floor(max_DMRS_port_index/PTRS_bearing_PRB_number).

In some embodiments, a default hopping step may be used. For example, if there are two codewords, a hopping step may equal 0 as a default behavior, and if there is only one codeword, a hopping step may equal 1 as the default behavior. In certain embodiments, if the associated DMRS port in a PTRS bearing PRB is known, then the RE position may be determined.

In certain embodiments, the PTRS for a UE may be associated with the DMRS port having the largest SINR in each PTRS bearing PRB. In such embodiments, there may be multiple ways to derive the associated DMRS port in each PTRS bearing PRB. One way to derive the associated DMRS port in each PTRS bearing PRB may be based on UE blind detection. Using blind detection, the UE may perform channel estimation on all assigned DMRS ports in a scheduled subframe for each PTRS bearing PRB, and based on the channel estimation result, the largest SINR DMRS port for a PTRS bearing PRB may be derived. Another way to derive the associated DMRS port in each PTRS bearing PRB may be based on a base unit 104 indication of associated DMRS port for each PTRS bearing PRB; however, there may be large overhead for this.

In some embodiments, coexistence of other RS and/or channels may be known to the base unit 104 before scheduling, so puncturing, shifting, and/or dropping of corresponding RS and/or channels may be done by the base unit 104. In certain embodiments, a UE may derive puncturing, shifting, and/or dropping behavior after decoding DCI signaling based on predefined rules, and then it may avoid misdetection.

In various embodiments, each UE may have a UE specific PTRS. Moreover, MU UEs may have different transmission layers. In some embodiments, MU may be transparent to a UE from DMRS perspective. In this case, the DMRS ports of a single UE and multiple UEs may occupy the same time/frequency resource, and the DMRS ports may code division multiplexed. In certain embodiments, the PTRS RE position may be restricted to be associated with the smallest DMRS port index per UE. In some embodiments, the precoding vector may be different for different PTRS bearing PRBs. An example is illustrated in FIGS. 10 and 11.

Figure 10:
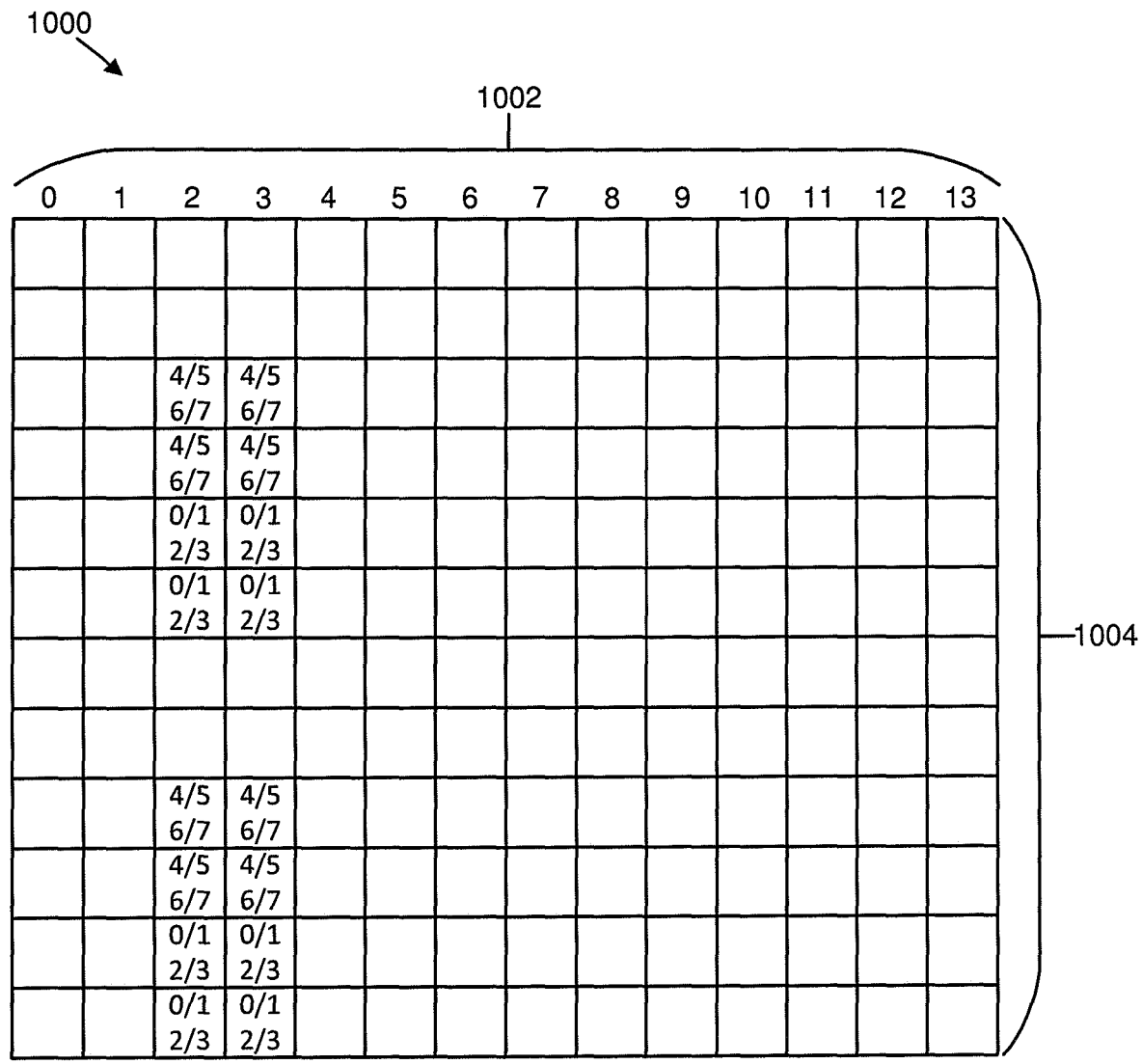
FIG. 10 is a schematic block diagram illustrating one embodiment of DMRS for multiple users.

FIG. 10 is a schematic block diagram illustrating one embodiment of DMRS for multiple users. Specifically, a DMRS pattern is illustrated in a set of resource elements 1000. Each resource element occupies a symbol 1002 in a time domain and a subcarrier 1004 in a frequency domain. 14 symbols 1002, and 12 subcarriers 1004 are illustrated in the set of resource elements 1000. UE1 is assigned DMRS port 0, UE2 is assigned DMRS port 2, and UE3 (e.g., a third UE) is assigned DMRS ports 2 and 3. The DMRS of these UEs occupy the same time/frequency resources as shown in FIG. 10.

Figure 11:
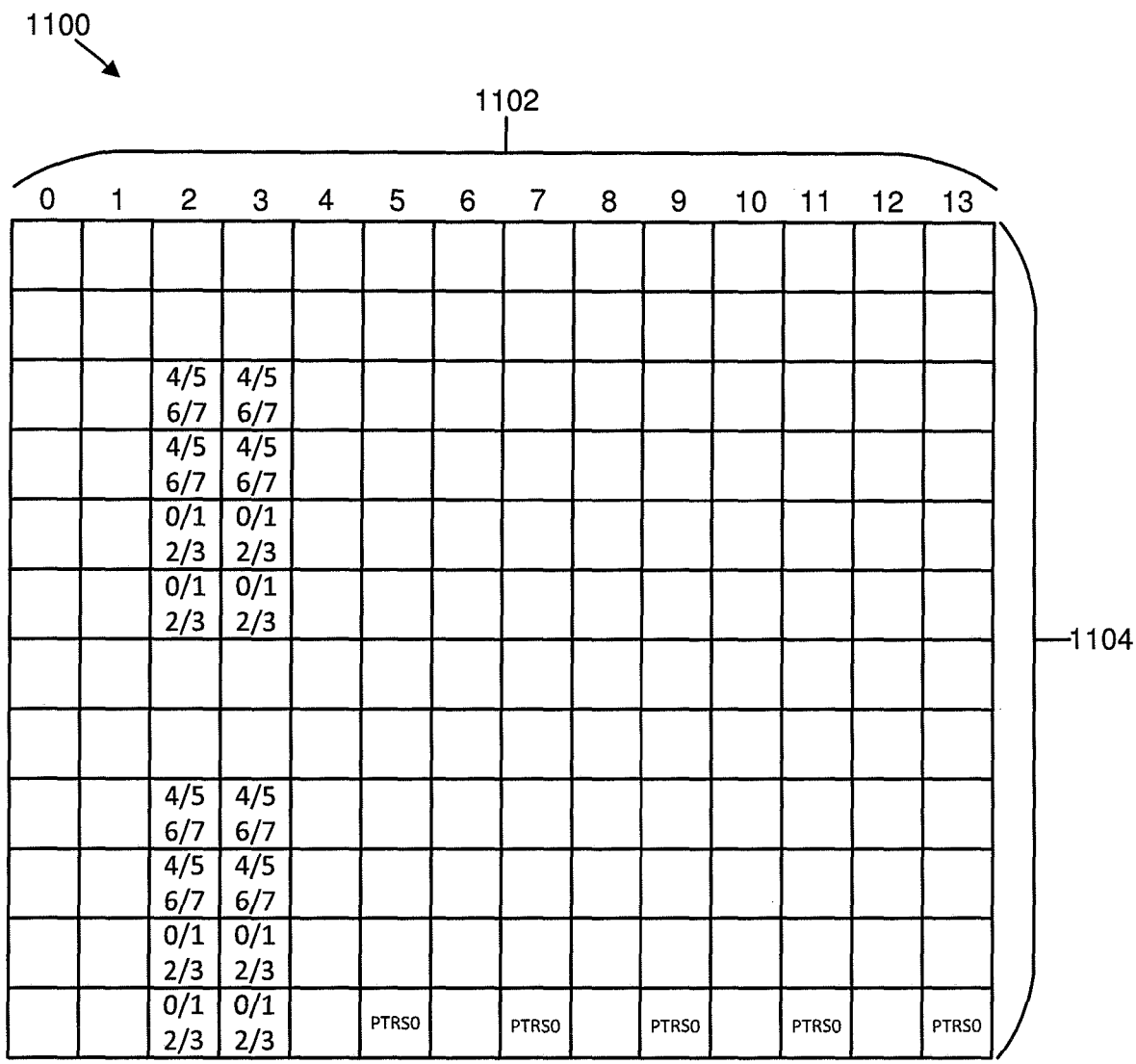
FIG. 11 is a schematic block diagram illustrating one embodiment of PTRS for multiple users.

FIG. 11 is a schematic block diagram illustrating one embodiment of PTRS for multiple users. Specifically, a PTRS pattern is illustrated in a set of resource elements 1100. Each resource element occupies a symbol 1102 in a time domain and a subcarrier 1104 in a frequency domain. 14 symbols 1102, and 12 subcarriers 1104 are illustrated in the set of resource elements 1100. In some embodiments, each UE has its own UE specific PTRS. The PTRS share the same RE position, which is RE position 0. The precoding vector of UE specific PTRS may be related to the associated DMRS port. UE1's PTRS port 0 may share the same precoding vector as DMRS port 0, UE2's PTRS port 0 may share the same precoding vector as DMRS port 1, and UE's PTRS port 0 may share the same precoding vector of DMRS port 2 or 3, depending on the PTRS bearing PRB index as in SU case.

In certain embodiments, MU may be be non-transparent to UE from DMRS perspective. In this case, both DMRS and PTRS occupation need to be informed to the co-scheduling UE for rate matching. In some embodiments, the PTRS RE position frequency hopping pattern may be known to the co-scheduled UE. In this case, the cell specific PTRS RE position hopping pattern based on the system bandwidth may be used, due to the fact that MU UEs may only have partial overlap bandwidth. In various embodiments, there may be a default pattern hopping step or the hopping step may be explicitly signaled by RRC signaling and/or DCI signaling.

In various embodiments, DFTS-OFDM may be used. In such embodiments, there may be pre-DFT insertion of PTRS. Moreover, if the associated DMRS port changes, multiplexing of data and PTRS may change from PRB to PRB. For example, in PTRS bearing PRB 0, PTRS port 0 may be associated with DMRS port 0, and multiplexed with data layer 0, and in PTRS bearing PRB 1, PTRS port 0 may be associated with DMRS port 1, and multiplexed with data layer 1. In certain embodiments, if always associated with DMRS port 0, PTRS may always be multiplexed with data layer 0. In some embodiments, precoder column permutation may be used to result in the largest SINR for DMRS port 0. MCS and/or CQI swapping at the transmitter side and UE side operation may also be used. As may be appreciated, the various embodiments described herein may be used for DL and/or UL.

Figure 12:
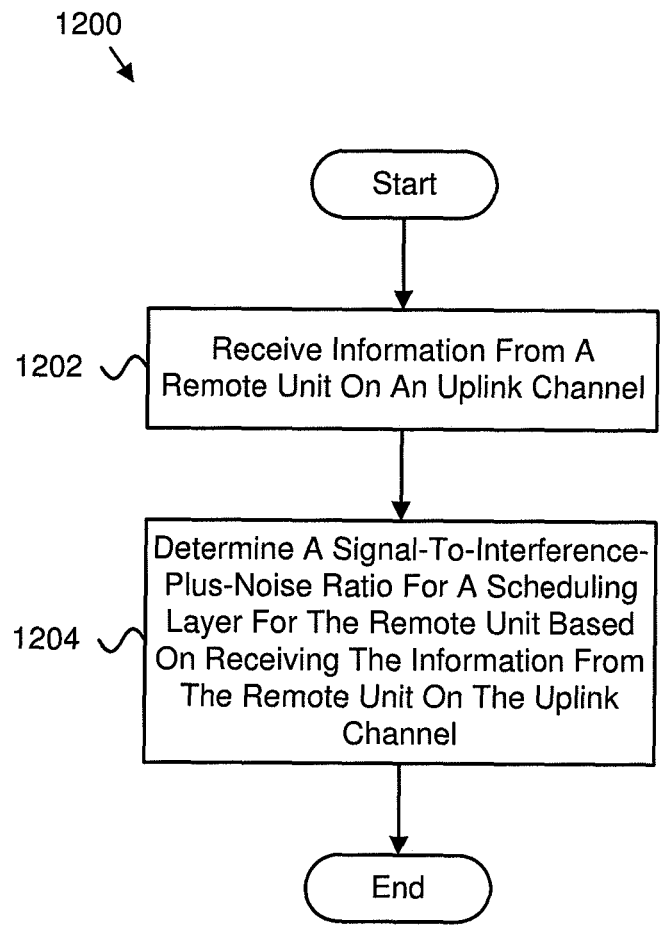
FIG. 12 is a schematic flow chart diagram illustrating one embodiment of a method for determining a SINR.

FIG. 12 is a schematic flow chart diagram illustrating one embodiment of a method 1200 for determining a SINR. In some embodiments, the method 1200 is performed by an apparatus, such as the base unit 104. In certain embodiments, the method 1200 may be performed by a processor executing program code, for example, a microcontroller, a microprocessor, a CPU, a GPU, an auxiliary processing unit, a FPGA, or the like.

The method 1200 may include receiving 1202 information from a remote unit 102 on an uplink channel. In certain embodiments, the method 1200 includes determining 1204 a signal-to-interference-plus-noise ratio for a scheduling layer for the remote unit 102 based on receiving the information from the remote unit on the uplink channel.

In one embodiment, the information from the remote unit on the uplink channel includes a report from the remote unit. In certain embodiments, the report includes channel quality indication reporting corresponding to two code words. In various embodiments, in response to a channel quality indication of a second codeword of the two code words indicating a better channel quality than a channel quality indication of a first codeword of the two codewords, the method 1200 includes swapping a modulation and coding scheme, a transport block size, or a combination thereof of the first and second codewords in downlink control information.

In some embodiments, in response to a channel quality indication of a second codeword of the two code words indicating a better channel quality than a channel quality indication of a first codeword of the two codewords, the method 1200 includes performing a precoder column permutation for layer 0 and a smallest layer of the second codeword. In one embodiment, the report includes signal-to-interference-plus-noise ratio reporting or channel quality indication reporting for each layer of multiple layers. In a further embodiment, in response to a signal-to-interference-plus-noise ratio report of layer 0 not being a best signal-to-interference-plus-noise ratio report or a channel quality indication report of layer 0 not being a best channel quality indication report, the method 1200 includes performing a precoder column permutation for layer 0 and a layer having the best signal-to-interference-plus-noise ratio report or the best channel quality indication report.

In certain embodiments, in response to the layer having the best signal-to-interference-plus-noise ratio report or the best channel quality indication report belonging to a second codeword, the method 1200 includes swapping a modulation and coding scheme, a transport block size, or a combination thereof of the first codeword and a second codewords in downlink control information. In various embodiments, the signal-to-interference-plus-noise ratio is based on a measurement of the uplink channel. In one embodiment, in response to a signal-to-interference-plus-noise ratio of layer 0 not being a largest signal-to-interference-plus-noise ratio based on the measurement, the method 1200 includes performing a precoder column permutation for layer 0 and a layer having the largest signal-to-interference-plus-noise ratio. In some embodiments, in response a largest signal-to-interference-plus-noise ratio based on the measurement belonging to a second codeword, the method 1200 includes performing a precoder column permutation between the first codeword and a second codeword.

In various embodiments, in response a largest signal-to-interference-plus-noise ratio based on the measurement belonging to a second codeword, the method 1200 includes swapping a modulation and coding scheme, a transport block size, or a combination thereof of the first codeword and a second codewords in downlink control information. In certain embodiments, in response a largest signal-to-interference-plus-noise ratio based on the measurement belonging to a second codeword, the method 1200 includes recalculating a modulation and coding scheme, a transport block size, or a combination thereof of the first codeword and indicating the modulation and coding scheme, the transport block size, or a combination thereof in downlink control information.

Figure 13:
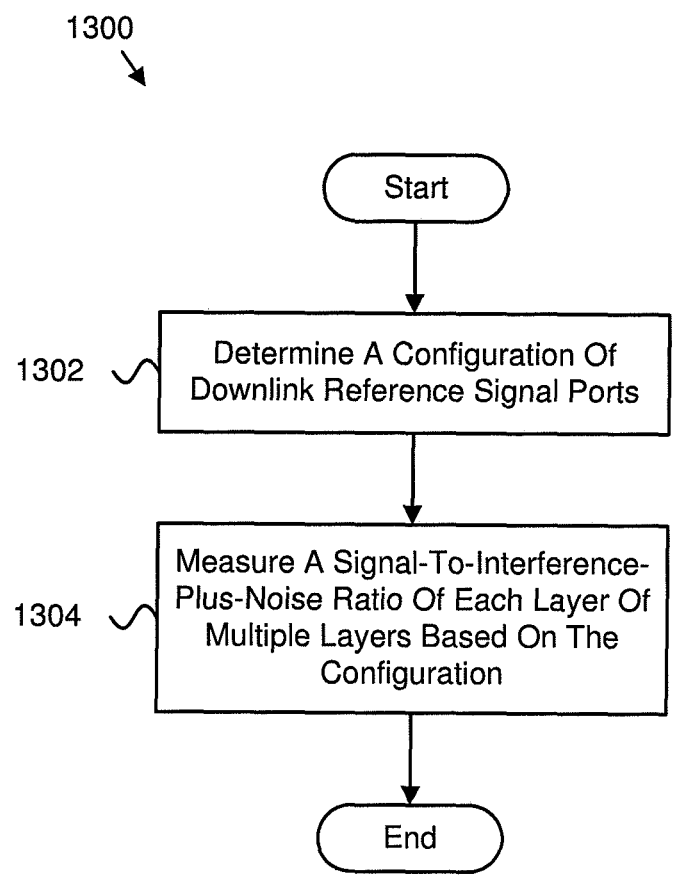
FIG. 13 is a schematic flow chart diagram illustrating one embodiment of a method for measuring SINR.

FIG. 13 is a schematic flow chart diagram illustrating one embodiment of a method 1300 for measuring SINR. In some embodiments, the method 1300 is performed by an apparatus, such as the remote unit 102. In certain embodiments, the method 1300 may be performed by a processor executing program code, for example, a microcontroller, a microprocessor, a CPU, a GPU, an auxiliary processing unit, a FPGA, or the like.

The method 1300 may include determining 1302 a configuration of downlink reference signal ports. In various embodiments, the method 1300 includes measuring 1304 a signal-to-interference-plus-noise ratio of each layer of multiple layers based on the configuration.

In one embodiment, the method 1300 includes performing codeword to layer mapping based on a number of layers of the multiple layers. In certain embodiments, the method 1300 includes transmitting a report including a largest signal-to-interference-plus-noise ratio layer based on measuring the signal-to-interference-plus-noise ratio of each layer.

In various embodiments, the method 1300 includes determining a precoding matrix based on measuring the signal-to-interference-plus-noise ratio of each layer. In some embodiments, each column of the precoding matrix includes a precoding vector, and each precoding vector is determined based on a corresponding layer of the multiple layers. In one embodiment, in response to a largest signal-to-interference-plus-noise ratio corresponding to a layer that is not layer 0, the method 1300 includes exchanging in the precoding matrix the precoding vector for layer 0 with the precoding vector for the layer having the largest signal-to-interference-plus-noise ratio to produce a permutated precoding matrix. In a further embodiment, the method 1300 includes determining a channel quality indication for each codeword of multiple codewords based on the permutated precoding matrix. In certain embodiments, the method 1300 includes transmitting a report including the channel quality indication for each codeword. In various embodiments, a base unit determines the permutated precoding matrix based on a layer having a largest signal-to-interference-plus-noise ratio and the precoding matrix. In one embodiment, the method 1300 includes transmitting a report including the precoding matrix.

Figure 14:
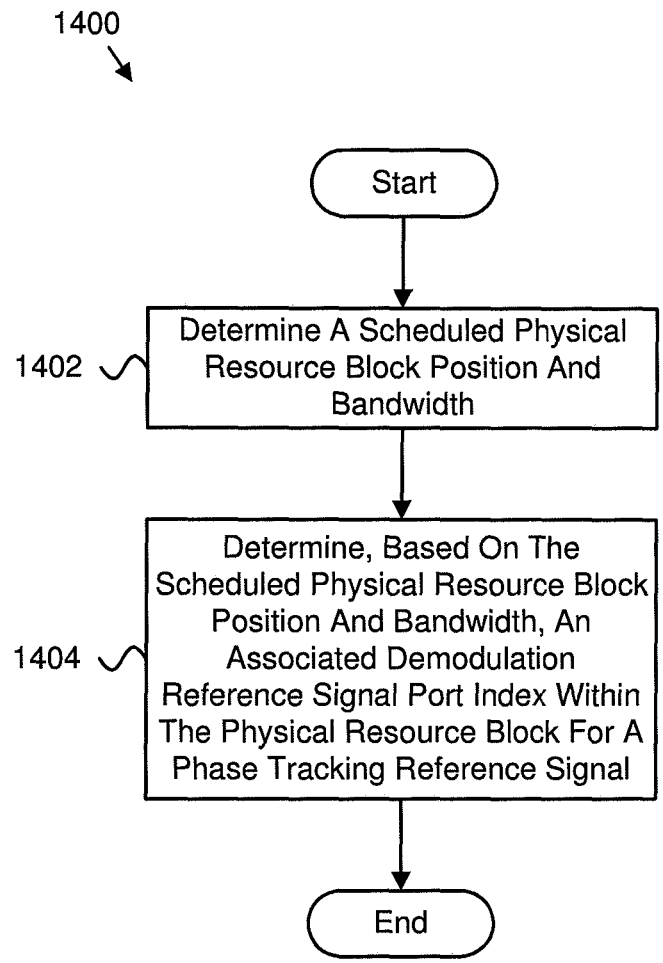
FIG. 14 is a schematic flow chart diagram illustrating one embodiment of a method for determining an association between DMRS and PTRS.

FIG. 14 is a schematic flow chart diagram illustrating one embodiment of a method 1400 for determining an association between DMRS and PTRS. In some embodiments, the method 1400 is performed by an apparatus, such as the remote unit 102. In certain embodiments, the method 1400 may be performed by a processor executing program code, for example, a microcontroller, a microprocessor, a CPU, a GPU, an auxiliary processing unit, a FPGA, or the like.

The method 1400 may include determining 1402 a scheduled physical resource block position and bandwidth. In certain embodiments, the method 1400 includes determining 1404, based on the scheduled physical resource block position and bandwidth, an associated demodulation reference signal port index within the physical resource block for a phase tracking reference signal.

In one embodiment, the method 1400 includes associating the phase tracking reference signal to a demodulation reference signal port based on the physical resource block bearing phase tracking reference signal with a smallest physical resource block index. In certain embodiments, the method 1400 includes associating the phase tracking reference signal to the smallest demodulation reference signal port index for the physical resource block bearing phase tracking reference signal with smallest physical resource block index.

In various embodiments, the method 1400 includes associating, based on a scheduled physical resource block position in a carrier or bandwidth part, the phase tracking reference signal to a demodulation reference signal port index for the physical resource block bearing phase tracking reference signal with smallest physical resource block index. In some embodiments, the method 1400 includes associating the phase tracking reference signal to the indicated demodulation reference signal port in downlink control information, radio resource control, or a combination thereof for the physical resource block bearing phase tracking reference signal with smallest physical resource block index. In one embodiment, the method 1400 includes determining a demodulation reference signal port index difference for adjacent phase tracking reference signals bearing physical resource blocks. In a further embodiment, the determined demodulation reference signal port index difference is based on a demodulation reference signal port difference between two codewords. In certain embodiments, the determined demodulation reference signal port index difference is based on a default value. In various embodiments, the determined demodulation reference signal port index difference is based on signaling by downlink control information, radio resource control, or a combination thereof. In one embodiment, the signaling is part of an uplink grant or a downlink assignment.

In some embodiments, the method 1400 includes determining a phase tracking reference signal resource element position within a physical resource block based on the demodulation reference signal port index. In certain embodiments, the method 1400 includes determining a phase tracking reference signal precoding vector to be the same as a precoding vector of the associated demodulation reference signal port. In various embodiments, the method 1400 includes determining a phase tracking reference signal resource element position within a physical resource block based on a smallest demodulation reference signal port index. In some embodiments, the method 1400 includes determining a phase tracking reference signal resource element position within a physical resource block based on radio resource control signaling.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method in a user equipment (UE), the method comprising:
   determining a plurality of physical resource blocks having phase tracking reference signals;
   receiving downlink control information (DCI) comprising resource allocation information that indicates a mapping between each physical resource block of the plurality of physical resource blocks and a corresponding demodulation reference signal port index of a plurality of demodulation reference signal port indexes;
   determining the mapping between each physical resource block of the plurality of physical resource blocks and the corresponding demodulation reference signal port index of the plurality of demodulation reference signal port indexes based on the DCI;
   determining a scheduled physical resource block position and bandwidth for a physical resource block of the plurality of physical resource blocks based on the DCI; and
   determining, based on the scheduled physical resource block position and bandwidth and the mapping, an associated demodulation reference signal port index of the plurality of demodulation reference signal port indexes within the physical resource block for a phase tracking reference signal.

2. The method of claim 1, further comprising associating the phase tracking reference signal to a demodulation reference signal port based on the physical resource block bearing phase tracking reference signal with a smallest physical resource block index.

3. The method of claim 2, further comprising associating the phase tracking reference signal to the smallest demodulation reference signal port index for the physical resource block bearing phase tracking reference signal with smallest physical resource block index.

4. The method of claim 2, further comprising associating, based on a scheduled physical resource block position in a carrier or bandwidth part, the phase tracking reference signal to a demodulation reference signal port index for the physical resource block bearing phase tracking reference signal with smallest physical resource block index.

5. The method of claim 2, further comprising associating the phase tracking reference signal to the indicated demodulation reference signal port in downlink control information, radio resource control, or a combination thereof for the physical resource block bearing phase tracking reference signal with smallest physical resource block index.

6. The method of claim 1, further comprising determining a demodulation reference signal port index difference for adjacent phase tracking reference signals bearing physical resource blocks.

7. The method of claim 6, wherein the determined demodulation reference signal port index difference is based on a demodulation reference signal port difference between two codewords.

8. The method of claim 6, wherein the determined demodulation reference signal port index difference is based on a default value.

9. The method of claim 6, wherein the determined demodulation reference signal port index difference is based on signaling by the downlink control information, radio resource control, or a combination thereof.

10. The method of claim 9, wherein the signaling is part of an uplink grant or a downlink assignment.

11. The method of claim 1, further comprising determining a phase tracking reference signal resource element position within a physical resource block based on the demodulation reference signal port index.

12. The method of claim 1, further comprising determining a phase tracking reference signal precoding vector to be the same as a precoding vector of the associated demodulation reference signal port.

13. The method of claim 1, further comprising determining a phase tracking reference signal resource element position within a physical resource block based on a smallest demodulation reference signal port index.

14. The method of claim 1, further comprising determining a phase tracking reference signal resource element position within a physical resource block based on radio resource control signaling.

* * * * *